April 16, 1929. H. KRANTZ Re. 17,269
TENTERING AND DRYING MACHINE FOR TEXTILE FABRICS
Original Filed Jan. 29, 1927 2 Sheets-Sheet 1
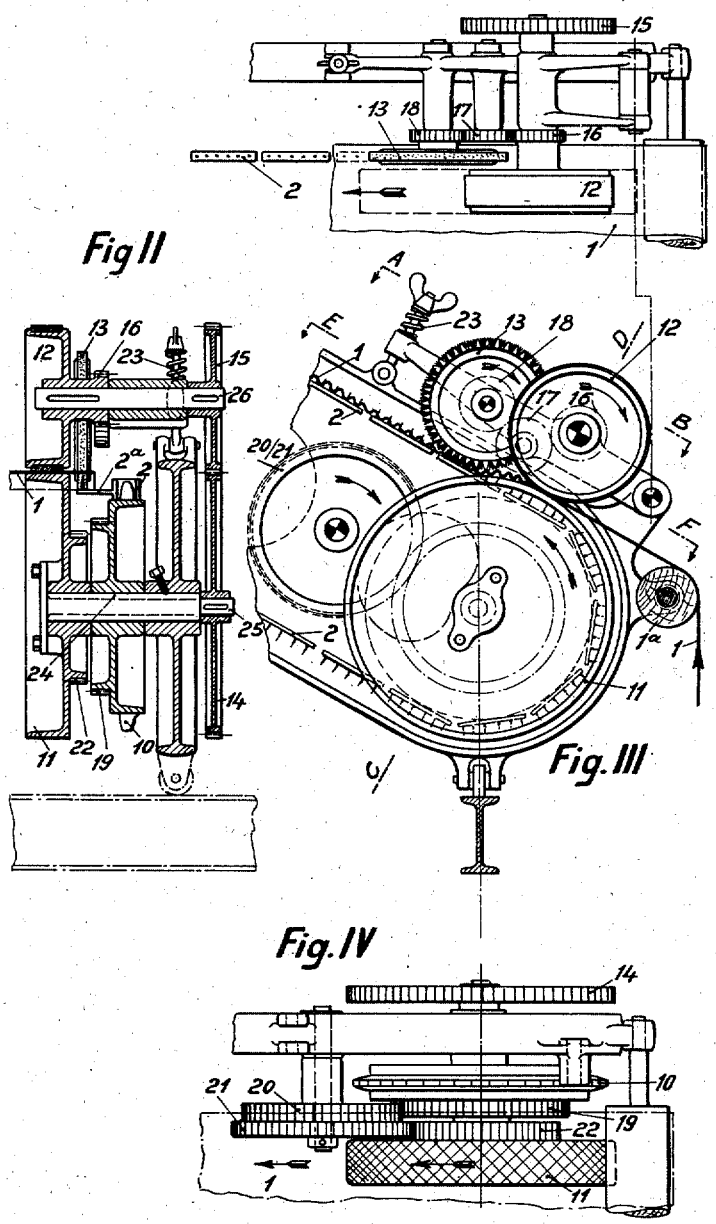
Inventor:
Dr. Hubert Krantz
per Jno Lurie
Attorney.

April 16, 1929. H. KRANTZ Re. 17,269
TENTERING AND DRYING MACHINE FOR TEXTILE FABRICS
Original Filed Jan. 29, 1927 2 Sheets-Sheet 2
Fig. V
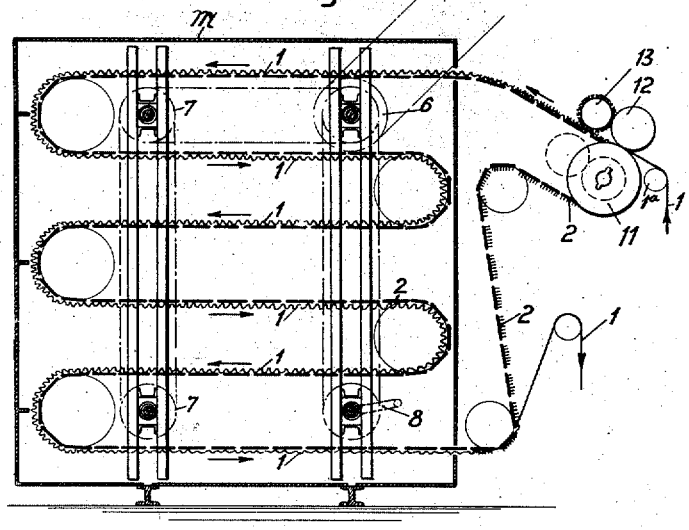
Fig. VI
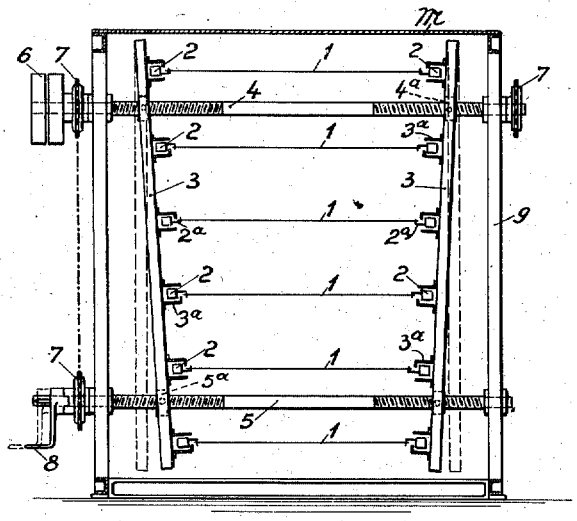
Inventor.
Dr. Hubert Krantz
per Jno Lurie
Attorney.

Reissued Apr. 16, 1929. Re. 17,269

UNITED STATES PATENT OFFICE.

HUBERT KRANTZ, OF AACHEN, GERMANY.

TENTERING AND DRYING MACHINE FOR TEXTILE FABRICS.

Original No. 1,673,253, dated June 12, 1928, Serial No. 164,563, filed January 29, 1927, and in Germany February 3, 1926. Application for reissue filed February 23, 1929, Serial No. 342,236.

This invention relates to tentering and drying machines of the type in which the fabric is guided in a tentered state through the drying chamber. In the known machines of this kind, there is a certain strain on the fabric in its longitudinal and transverse direction, wherefore these machines are also called stretching, tentering and drying machines. Without regard to the manner in which the fabric is fed to the conveying means, for instance to the usual conveying chains, the strain is mainly caused by the fact that the cloth contracts in its longitudinal and transverse direction in accordance with the progress of the drying, while it is being rigidly held by the chains. This is a disadvange for certain fabrics, especially for woolen cloth, because woolen cloth when dried in a stretched condition is fixed so that a subsequent natural contraction of the fabric in the finished product is rendered impossible. The tension in the transverse direction may be avoided by introducing the fabric into the machine with a considerable sag in the direction of its width so that an additional strain would not arise during the progress of the drying action. However, conveying the fabric through the drying chamber in such a condition would entail serious drawbacks such as the danger of a disengagement of the fabric from the chains, contacting of adjacent fabric layers, impeding the circulation of air, non-uniform drying, et cetera.

Now, the invention has for its object to provide a tentering and drying machine of the above-stated kind in which both the longitudinal and transverse strains on the fabric are avoided in a simple and efficient manner which does not in any way affect the fabric nor the security of working and which maintains all advantages of the drying of textile fabrics in a tentered state over the drying in a non-tentered state.

The object of the invention is attained on the one hand by feeding the wet fabric to the conveying mechanism at a speed so much larger than the speed of this mechanism that a longitudinal tension arises neither during the seizing of the fabric by the conveying mechanism nor during the drying process. On the other hand, the breath of the tenter, i. e. the distance between the chainways, is gradually reduced in accordance with the progress of drying in such a manner that a tension in the direction of the fabric width is prevented too.

The invention allows of obtaining a dried goods which is free from crumples.

In order to allow of the invention to be more fully understood, it will now be described with reference to the accompanying drawings which illustrate, by way of example, a tentering and drying machine constructed in accordance with the invention.

Fig. 1 is a fractional plan view, according to the line A—B of Fig. 3, of the device designed to prevent the longitudinal strain and arranged in front of the inlet of the machine.

Fig. 2 is a transverse section of the device along the line C—D of Fig. 3.

Fig. 3 is a side elevation of the device.

Fig. 4 is a plan view taken on the line E—F of Fig. 3.

Fig. 5 is a diagrammatic longitudinal section of the machine and

Fig. 6 is a diagrammatic transverse section of the same.

1 denotes the fabric which is fed to the machine M over a guide roller $1^a$ in the usual way. 2 are the endless conveying chains which receive the fabric 1 and guide it through the machine.

Mounted loosely on suitably supported stub shafts 24, Fig. 2, at both sides of the machine are sprocket wheels 10 which are driven by the chains 2. The fabric is seized at its edges by feed rollers 11, 12 and fed into the machine in the direction of the arrows. The upper feed roller 12 is under the pressure of a spring 23. The lower feed roller 11 has rotation imparted to it through a gearing 19, 20, 21 and 22 in such a manner that its circumferential speed is by a certain amount greater than the speed of the conveying chains 2. The difference of these speeds may be altered at will by changing the ratio of the said gearing. The upper feed roller 12 has the same circumferential speed as the lower feed roller 11 and is driven by the latter through a shaft 25, gear wheels 14, 15 and shaft 26. The rotary brush 13 which serves to engage the fabric 1 with the hooks $2^a$ of the chains 2, is driven with the same circumferential speed as the feed rollers 11, 12 from the shaft 26 through the intermediary of the spur wheels 16, 17 and 18, Fig. 1.

After the fabric emerges from the feed rollers 11, 12, its longitudinal edges are pressed by the brushes 13 into the hooks $2^a$ of the chains 2 which move at a lower speed than the brush and the feed rollers. This difference of speeds causes the fabric to be fastened to the chains without any longitudinal tension in a slightly undulatory condition as more particularly shown in Fig. 3. The fabric is passed in this unstretched condition through the whole drying chamber of the machine M in the manner illustrated in Fig. 5. After leaving the machine at its lower end, the fabric 1 disengages from the conveying chains 2 in a well known manner.

Fig. 6 shows the means which serve to decrease the breadth of the tenter, i. e. the distance between corresponding chainways $3^a$, in accordance with the progress of the drying action. The chainways $3^a$ are fastened to carrying bars 3. The distance between opposite carrying bars is adapted to be adjusted by means of threaded spindles 4 and 5 which pass through nuts $4^a$ and $5^a$ which are pivotally mounted in the bars 3. The spindles 4 and 5 are mounted in a suitable manner in the side frames 9 of the machine. The upper spindles 4 are adapted to be driven by belt pulleys 6, while the lower spindles 5 may be rotated from the upper spindles through chain drives 7. As in the machine illustrated, the moisture-laden fabrics 1 are introduced into the drying chamber at the top and the dry fabrics carried out of same at the bottom, provision has to be made for permitting the distance between the chainways to be decreased downwardly in order to reduce the breadth of the tenter in accordance with the progressive drying. To this end, there is provided a coupling with a hand crank 8 by means of which the chain drive 7 may be disengaged from the lower spindle 5 and the latter adjusted independently from the upper spindle 4. In this way, any desired reduction of the breadth of the tenter may be easily obtained.

In cases where longitudinal and transverse tension on the fabrics is admissible or desirable, the machine described may be used in the same manner as the known machines by returning the chainway-carrying bars 3 to the vertical position and causing the fabric feeding means 11, 12, 13 to run with the same speed as the fabric conveying means 2.

Having thus described my invention, what I claim as new and desire to secure by Letters Patent, is:

1. A tentering and drying machine, comprising a pair of horizontally spaced endless chains for conveying the fabric through the machine from top to bottom along a circuitous path, a plurality of vertically spaced pairs of chainways for guiding the chains, hooks on the chains for engaging and holding the fabric at its longitudinal edges, pairs of feed rollers for feeding the fabric to the conveying chains, rotary brushes for pressing the fabric edges into the hooks of the chains, means for imparting to the feed rollers and brushes a lead with respect to the chains, pairs of upright bars for carrying the chainways, and means connected with these chainway-carrying bars for placing the bars of each pair at an incline so as to gradually reduce the distance between them in a direction from the top to the bottom of the machine.

2. A method of drying fabric consisting in feeding the fabric through a drying chamber at a speed less than that at which the fabric is fed to the chamber, maintaining it laterally taut throughout the length of the drying chamber, sufficient to prevent wrinkling of the fabric but not the shrinking thereof.

DR. HUBERT KRANTZ.